(12) United States Patent
Skillman

(10) Patent No.: US 7,941,741 B1
(45) Date of Patent: May 10, 2011

(54) DYNAMICALLY MANIPULATING CONTENT TO FORCE WEB BROWSERS TO OPEN MORE CONNECTIONS

(75) Inventor: DJ Skillman, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1337 days.

(21) Appl. No.: 11/456,725

(22) Filed: Jul. 11, 2006

(51) Int. Cl.
*G06F 17/00* (2006.01)
(52) U.S. Cl. .................................... 715/208; 715/271
(58) Field of Classification Search .................. 715/205, 715/208, 255, 271
See application file for complete search history.

(56) References Cited

U.S. PATENT DOCUMENTS

| | | | | |
|---|---|---|---|---|
| 6,311,197 | B2 * | 10/2001 | Mighdoll et al. | 715/201 |
| 6,321,242 | B1 * | 11/2001 | Fogg et al. | 715/236 |
| 6,578,066 | B1 | 6/2003 | Logan et al. | 718/105 |
| 6,775,235 | B2 * | 8/2004 | Datta et al. | 370/238 |
| 6,871,213 | B1 * | 3/2005 | Graham et al. | 709/205 |
| 6,922,761 | B2 * | 7/2005 | O'Connell et al. | 711/162 |
| 6,970,888 | B1 * | 11/2005 | Sciarra | 711/173 |
| 7,082,476 | B1 * | 7/2006 | Cohen et al. | 709/246 |
| 7,168,094 | B1 * | 1/2007 | Fredell | 726/29 |
| 7,219,299 | B2 * | 5/2007 | Fields et al. | 715/205 |
| 7,284,056 | B2 * | 10/2007 | Ramig | 709/227 |
| 7,406,498 | B2 * | 7/2008 | Reshef et al. | 709/203 |
| 7,492,787 | B2 * | 2/2009 | Ji et al. | 370/466 |
| 7,668,954 | B1 * | 2/2010 | Melvin | 709/224 |
| 7,702,521 | B2 * | 4/2010 | Bascom | 705/1.1 |
| 2002/0194382 | A1 * | 12/2002 | Kausik et al. | 709/246 |
| 2003/0105830 | A1 * | 6/2003 | Pham et al. | 709/216 |
| 2003/0225859 | A1 * | 12/2003 | Radia et al. | 709/219 |
| 2005/0162422 | A1 * | 7/2005 | Miyata | 345/440 |
| 2005/0177595 | A1 * | 8/2005 | Krieg et al. | 707/104.1 |
| 2006/0041830 | A1 * | 2/2006 | Bohn | 715/501.1 |
| 2007/0016848 | A1 * | 1/2007 | Rosenoff et al. | 715/501.1 |
| 2009/0049120 | A1 * | 2/2009 | Sakairi et al. | 709/203 |

OTHER PUBLICATIONS

Ashman, Helen, "Electronic Document Addressing: Dealing With Change", Computing Surveys (CSUR), vol. 32, Issue 3, Sep. 2000, pp. 201-212.*
Chakrabarti, Soumen,"Integrating the Document Object Model With Hyperlinks for Enhanced Topic Distillation and Information Extraction", Proceedings of the 10th International Conference on World Wide Web, ACM, Apr. 2001, pp. 211-220.*
IEBlog: Internet Explorer and Connection Limits; http://blogs.msdn.com; Apr. 11, 2005; 1 page.
Fasterfox—Performance and network tweaks for Firefox; http://fasterfox.mozdev.org; Jun. 16, 2006 (print date); 11 pages.
Winlnet limits connections per server; http://support.microsoft.com; Jan. 23, 2006; 2 pages.
R. Fielding et al.; Hypertext Transfer Protocol—HTTP/1.1; Network Working Group; Request for Comments 2616; Jun. 1999; pp. 1-114.
Tony Gentilcore, "Firefox—Performance and Network Tweaks for Firefox", http://fasterfox.mozdev.org, 2005, 11 pages.

* cited by examiner

*Primary Examiner* — Laurie Ries
(74) *Attorney, Agent, or Firm* — Harrity & Harrity, LLP

(57) ABSTRACT

A system may identify a group of first links in a document, where the first links correspond to a group of objects within the document and are associated with a same identifier. The system may replace the first links in the document with second links that point to a number of different identifiers, and forward the document with the second links to a client.

45 Claims, 14 Drawing Sheets

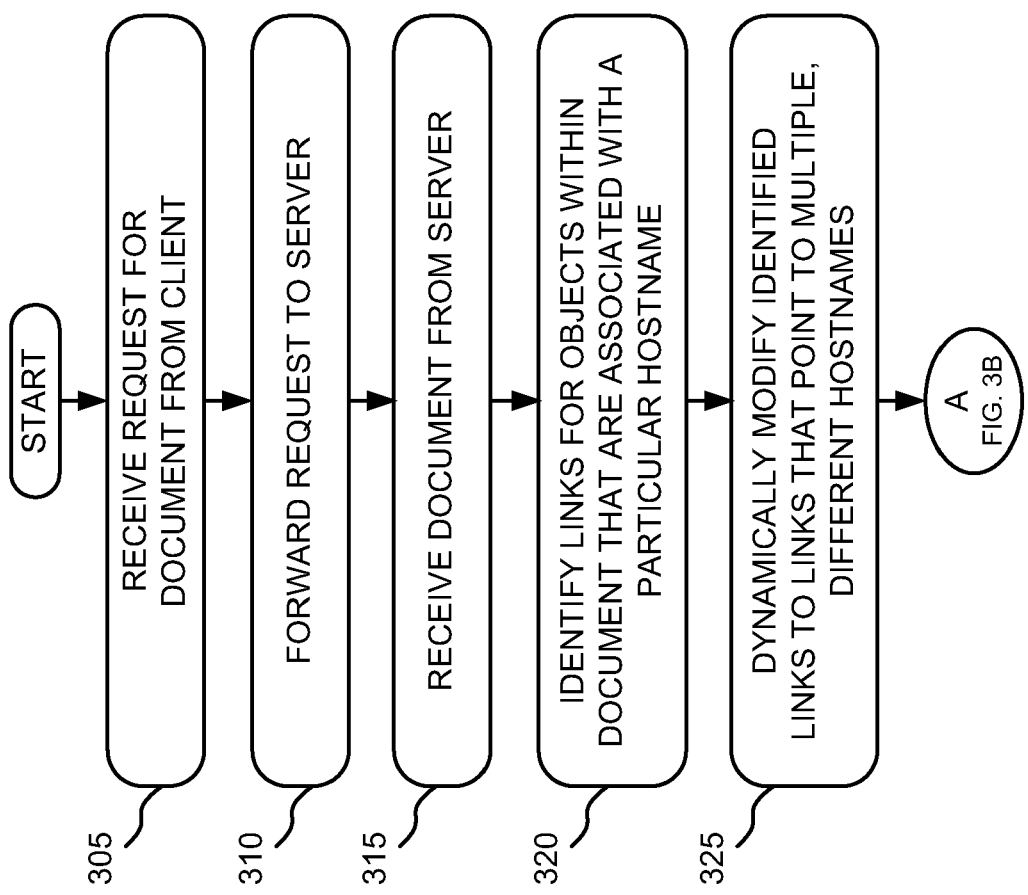

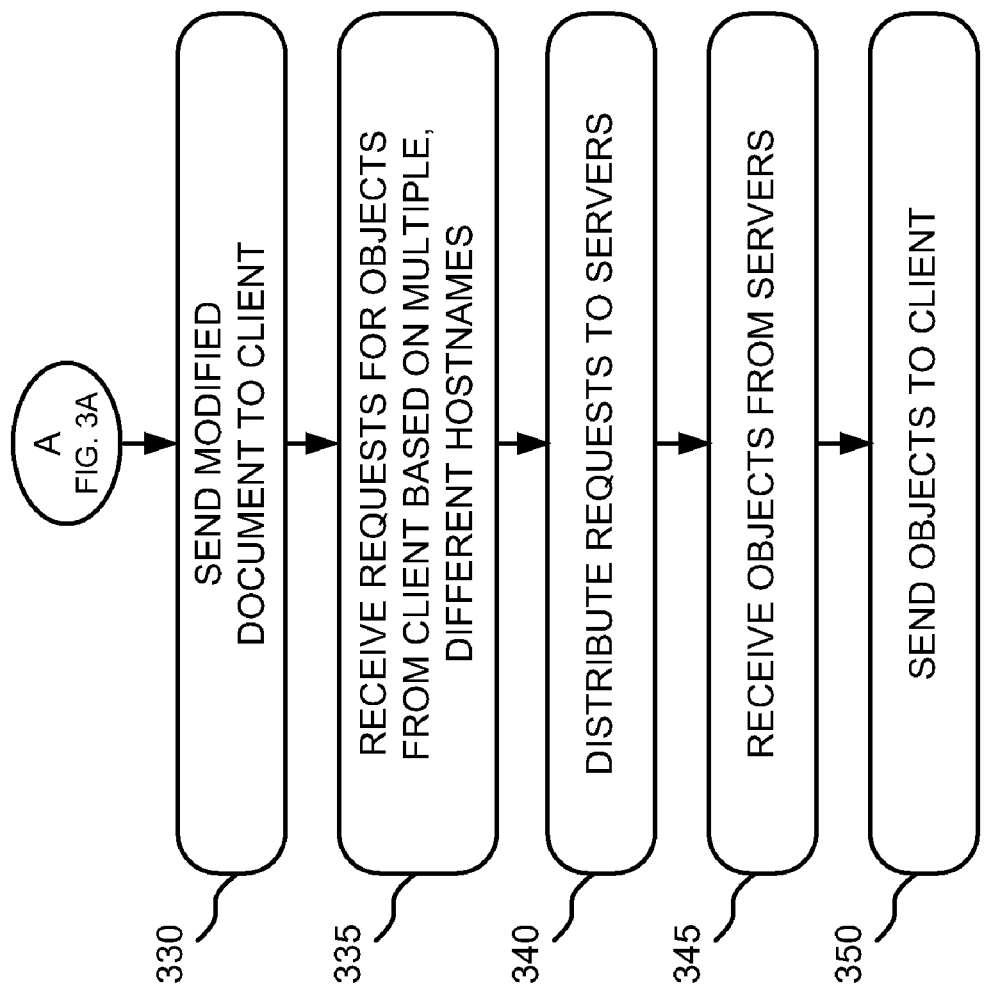

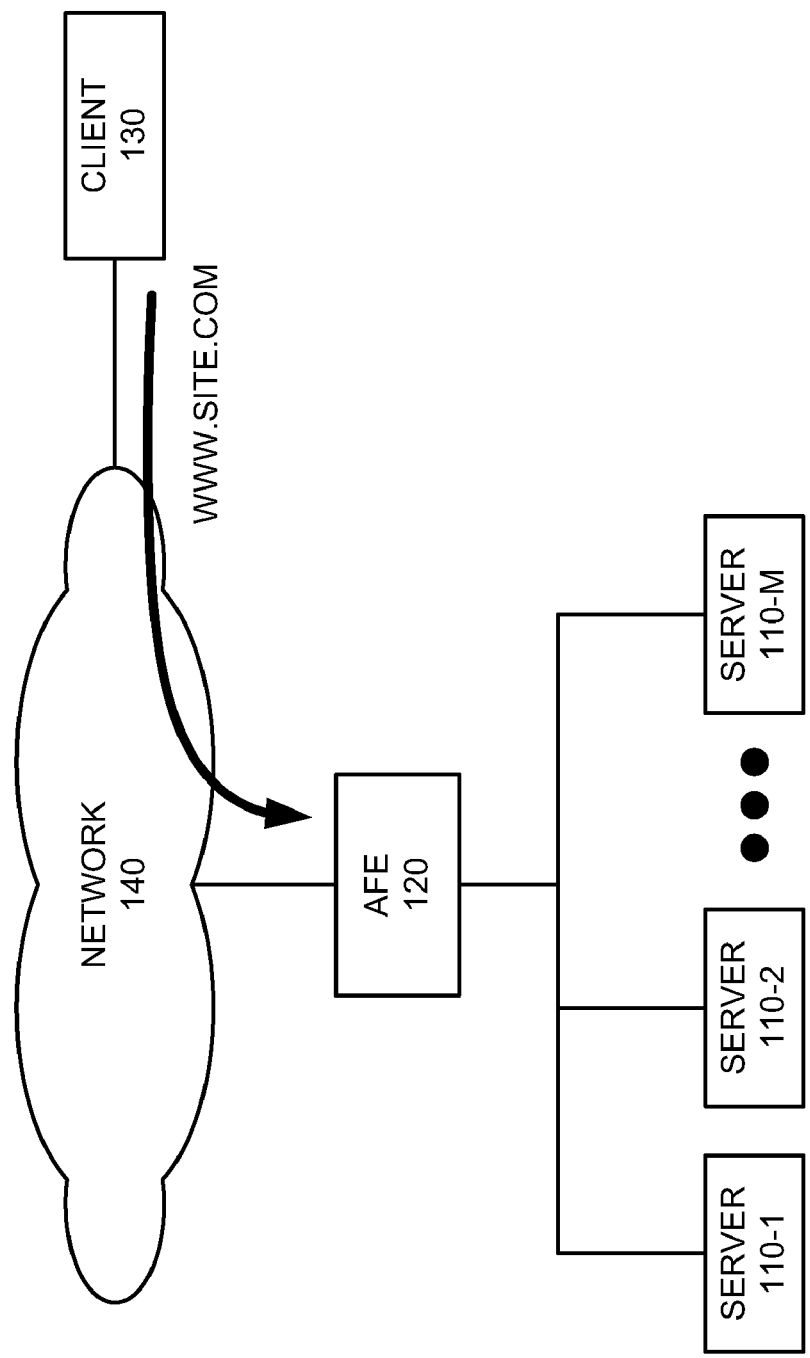

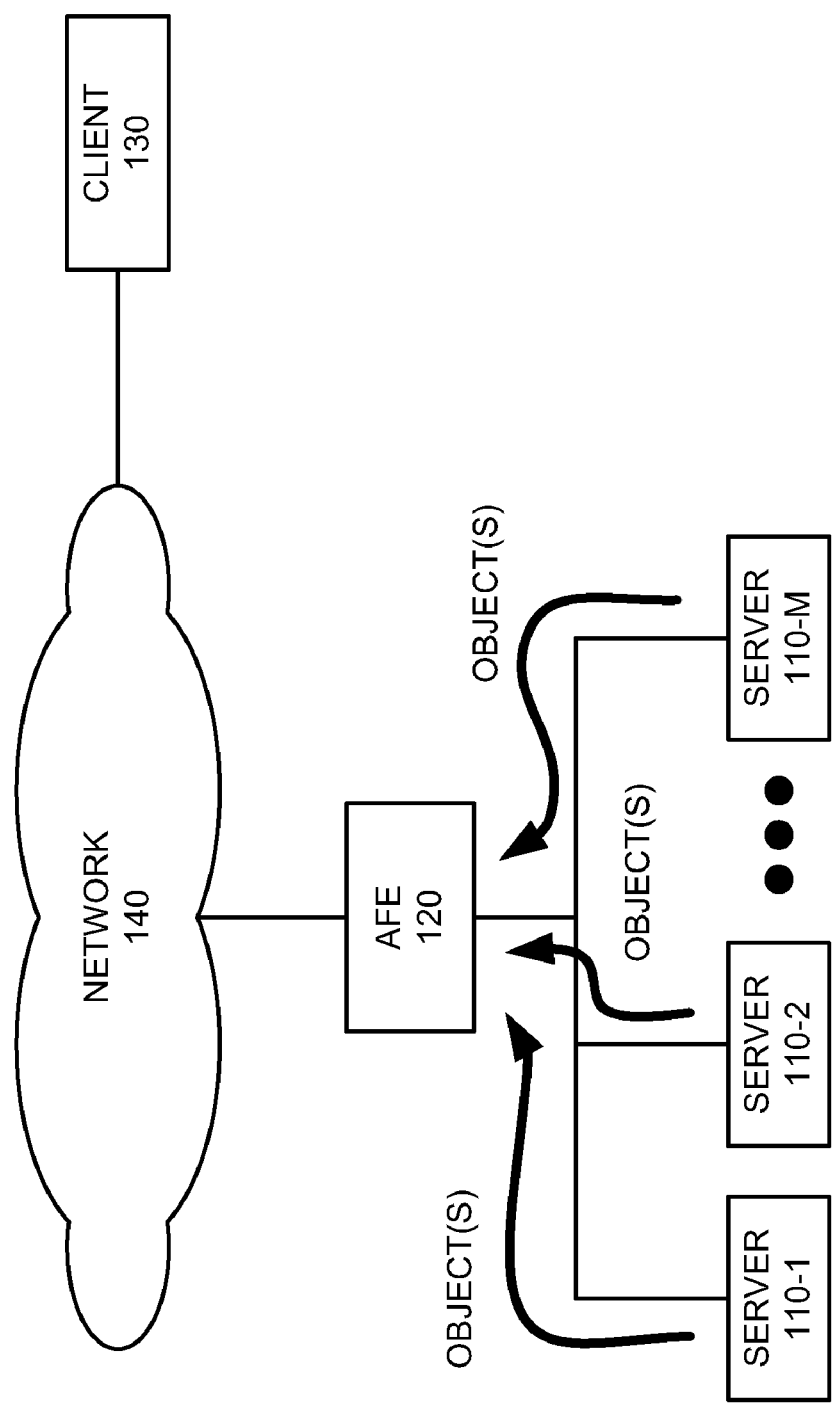

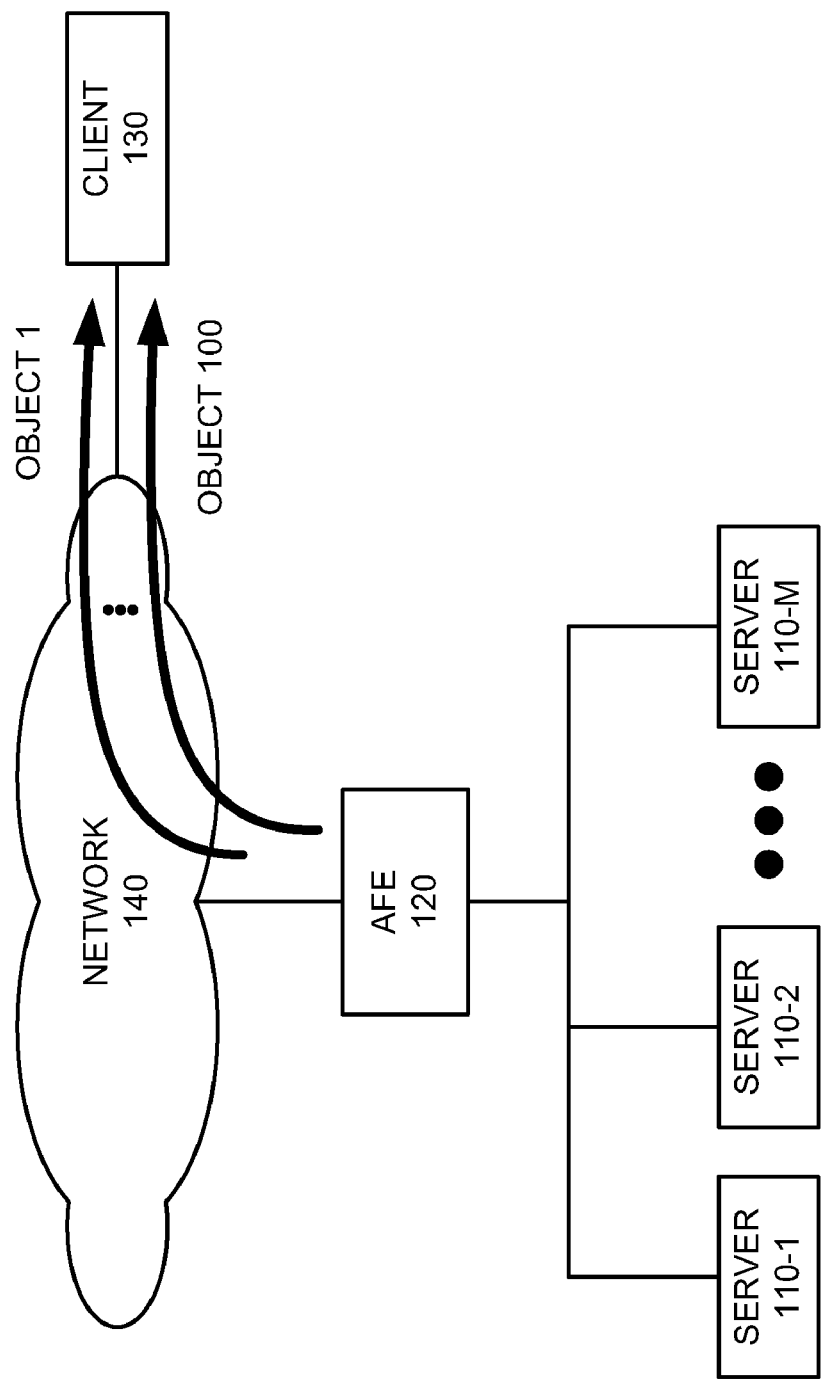

DYNAMICALLY MANIPULATING CONTENT TO FORCE WEB BROWSERS TO OPEN MORE CONNECTIONS

BACKGROUND

1. Field of the Invention

Implementations described herein relate generally to data communication and, more particularly, to communication between a client and a server.

2. Description of Related Art

The Hypertext Transfer Protocol (HTTP) is a sessionless and stateless protocol that runs over Transmission Control Protocol (TCP) connections. HTTP is a serial process, such that over any one TCP connection, only one object of a web page can download at a time. Web browsers, such as Internet Explorer, normally open no more than two TCP connections to a web server. Many web pages have dozens, if not hundreds, of objects that can only be downloaded two at a time (i.e., one over each of the two TCP connections). Over high latency links, it can take minutes to download all of the objects of a web page. Sometimes, a web browser can issue several requests for the objects of a web page and time out before all of the objects are downloaded since the objects download at a maximum rate of one at a time over each of the two TCP connections.

SUMMARY

According to one aspect, a method may include receiving a document that includes a group of first links for a corresponding group of objects within the document, each of the first links being associated with a same hostname; automatically modifying the first links in the document to second links that point to a number of different hostnames; and transmitting the document with the second links to a client.

According to another aspect, a system may include means for receiving a document that includes a group of first links, associated with a particular hostname, for a corresponding group of objects within the document; means for identifying a number of different hostnames; means for modifying the first links in the document to second links associated with the number of different hostnames; and means for transmitting the document with the second links to a client.

According to yet another aspect, a device may include logic to identify a group of first links in a document, the first links corresponding to a group of objects within the document and being associated with a same hostname; logic to replace the first links in the document with second links that point to a number of different hostnames; and logic to forward the document with the second links to a client.

According to a further aspect, a method, performed by a device, may include receiving a document that includes a group of first links for a corresponding group of objects within the document, each of the first links corresponding to a same identifier; automatically modifying the first links in the document to a group of second links that point to a number of different identifiers, each of the different identifiers resolving to the device; and transmitting the document with the second links to a client.

According to another aspect, a device may include logic to identify a number of first links in a document, where the first links may correspond to a number of objects within the document and may be associated with a same hostname. The device may also include logic to replace the first links in the document with second links associated with a number of different addresses, and logic to forward the document with the second links to a client.

According to a further aspect, a device may include logic to identify a number of first links in a document, where the first links may correspond to a number of objects within the document and may be associated with a same hostname. The device may also include logic to replace the first links in the document with second links associated with a number of different port numbers, and logic to forward the document with the second links to a client.

BRIEF DESCRIPTION OF THE DRAWINGS

The accompanying drawings, which are incorporated in and constitute a part of this specification, illustrate one or more embodiments consistent with the principles of the invention and, together with the description, explain aspects of the invention. In the drawings.

FIGS. 3A and 3B are flowcharts of exemplary processing for dynamically modifying links; and FIGS. 4-13 are diagrams illustrating an exemplary implementation.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein may automatically modify links in a document that are associated with a particular identifier to links that point to multiple, different identifiers. As a result, a browser on a client may open additional connections (e.g., TCP connections) to download objects associated with these links.

An "identifier," as used herein, may refer to a hostname, an address (e.g., an Internet Protocol (IP) address), a port number (e.g., a TCP port number), another type of data to identify a network device or a port of a network device, or a combination of this information. An "object," as used herein, may refer to any type of resource that may be needed to render a document, such as text, an image, a video clip or stream, an audio clip or stream, programming code (e.g., Javascript), or another type of content. A "document," as used herein, may refer to any computer-readable and/or computer-storable work product. A common form of document found on the Internet is a web page.

In the description to follow, an identifier will be described in terms of a hostname. It should be understood, however, that the description equally applies to other types of identifiers, such as addresses, port numbers, etc. In the context of hostnames, implementations described herein may automatically modify links in a document that are associated with a particular hostname to links that point to multiple, different hostnames. As a result, a browser on a client may open additional connections (e.g., TCP connections) to download objects associated with these links.

Exemplary Network

Figure 1:
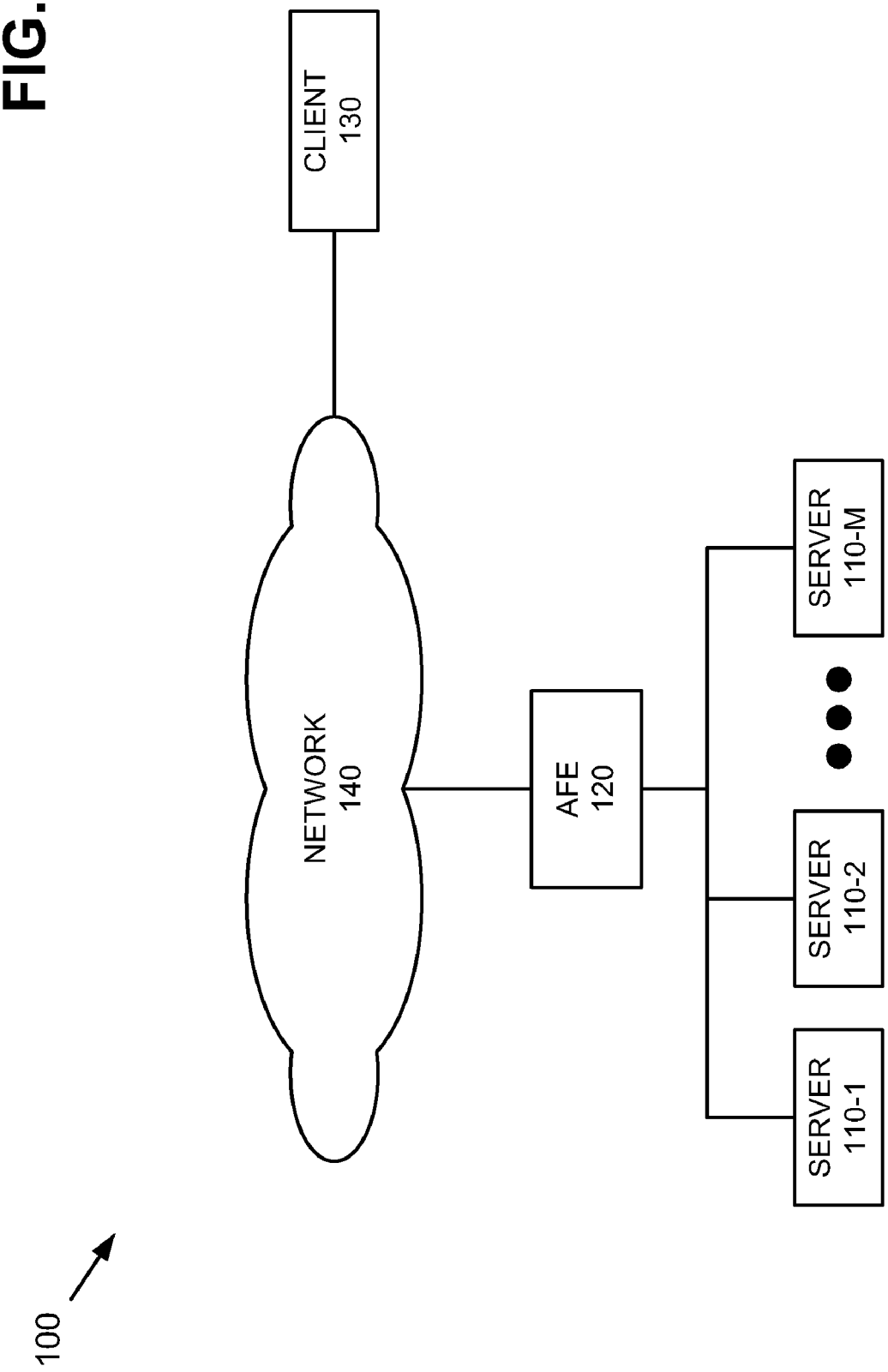
FIG. 1 is an exemplary diagram of a network in which systems and methods described herein may be implemented.

FIG. 1 is an exemplary diagram of a network 100 in which systems and methods described herein may be implemented.

Network 100 may include servers 110-1, 110-2, ..., 110-M (where M≧2) (collectively referred to herein as "servers 110"), an application front end (AFE) 120, a client 130, and a network 140. A particular number and arrangement of devices are shown in FIG. 1. In practice, there may be more or fewer devices or a different arrangement of devices. Further, while FIG. 1 shows servers 110 and AFE 120 co-located, one or more of these devices may be remotely located.

Servers 110 may include devices that provide information and/or services to locally or remotely connected client devices. In one exemplary implementation, a server 110 may include a web server that serves web content and/or services. In another exemplary implementation, a server 110 may include a corporate server that hosts or manages content for a corporate network. Servers 110 may be associated with a same entity, such as a same company. Servers 110 may appear to client 130 as a single server 110. In other words, client 130 may be unaware of how many servers 110 operate behind AFE 120.

AFE 120 may include a device that operates as an interface for servers 110. For example, AFE 120 may process requests intended for servers 110 and responses from servers 110. In one implementation, AFE 120 may perform multiplexing functions on the server side and demultiplexing functions on the network side. For example, AFE 120 may receive communication via a large number of connections (possibly numbering in the thousands or even hundreds of thousands) on the network side and multiplex the communication over a relatively small number of connections on the server side. AFE 120 may receive communication via the small number of connections on the server side and demultiplex the communication over the large number of connections on the network side.

AFE 120 may also provide various services to improve the operation of servers 110. For example, AFE 120 may take over CPU-intensive tasks from servers 110. Other exemplary services that may be provided by AFEs 120 might include server load balancing, server monitoring, acceleration, scaling and high availability features, and/or global server load balancing. Server load balancing might include balancing the load on servers 110 (e.g., distributing the number of requests given to servers 110). Server monitoring might include periodic health checks on servers 110 to assure that a server 110 is functioning properly before sending a request to it. Acceleration might include techniques to provide efficient access to servers 110, such as multiplexing requests, compression, caching of server content, and/or keeping client connections alive. While a single AFE 120 is shown in FIG. 1, multiple AFEs 120 may be connected between servers 110 and network 140 for increased performance. The scaling and high availability features might include techniques to enable multiple AFEs 120 to function together as a single device. When one or more of servers 110 are remotely located, global server load balancing might permit client devices to connect to servers 110 best equipped to fulfill their requests, regardless of the location of servers 110.

As described below, AFE 120 may dynamically change links in a document that are associated with a particular hostname to links that point to multiple, different hostnames. Each link that points to a different hostname may cause client 130 to open two additional connections (e.g., TCP connections) to download objects associated with the document.

Client 130 may include a device that can request information and/or services from a server 110. Client 130 may include any type of computation or communication device, such as a personal computer, a lap top, a telephone device (cordless, wireline, cellular), a personal digital assistant (PDA), or another type of device. Client 130 may use browser software, for example, to interface to network 140.

Network 140 may include a wide area network (WAN) (e.g., the Internet), a local area network, a telephone network (e.g., the Public Switched Telephone Network (PSTN)), an intranet, or a combination of networks. Communication among servers 110, AFE 120, client 130, and network 140 may be accomplished via wired, wireless, and/or optical communication connections.

Exemplary AFE Configuration

Figure 2:
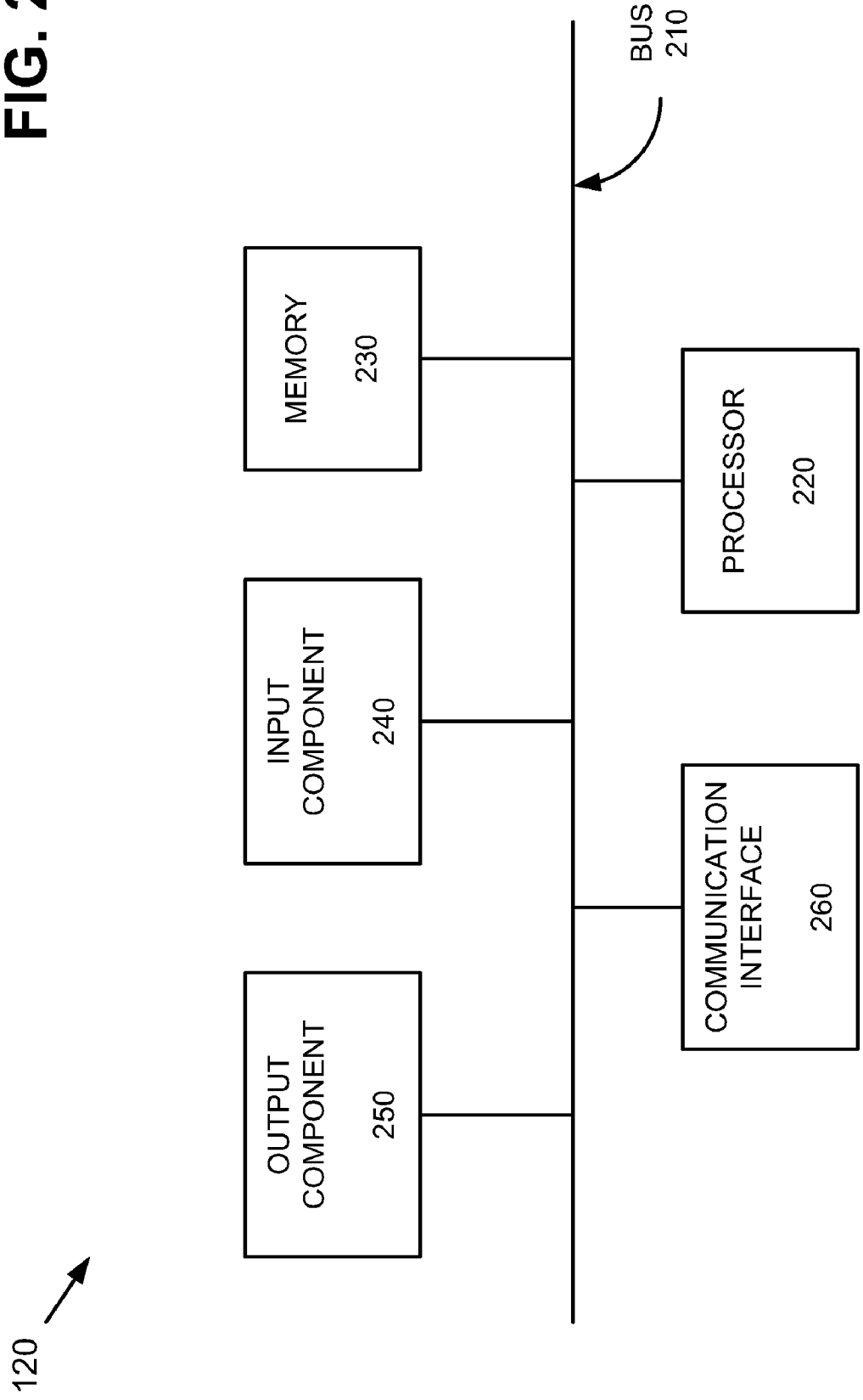
FIG. 2 is an exemplary block diagram of an application front end of FIG. 1.

FIG. 2 is an exemplary block diagram of AFE 120. As shown in FIG. 2, AFE 120 may include a bus 210, a processor 220, a memory 230, an input component 240, an output component 250, and a communication interface 260. Bus 210 may include a path that permits communication among the elements of AFE 120.

Processor 220 may include a processor, microprocessor, or processing logic that may interpret and execute instructions. Memory 230 may include a random access memory (RAM) or another type of dynamic storage device that may store information and instructions for execution by processor 220; a read only memory (ROM) device or another type of static storage device that may store static information and instructions for use by processor 220; and/or a magnetic and/or optical recording medium and its corresponding drive.

Input component 240 may include a mechanism that permits an operator to input information to AFE 120, such as a web browser or command line interface, or a control button or switch. Output component 250 may include a mechanism that outputs information to the operator, such as an LED or some form of display. Communication interface 260 may include any transceiver-like mechanism(s) that enables AFE 120 to communicate with other devices and/or systems.

AFE 120 may perform certain operations, as described in detail below. AFE 120 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Exemplary Processing

FIGS. 3A and 3B are flowcharts of exemplary processing for dynamically modifying links. The processing described with regard to FIGS. 3A and 3B may be performed by AFE 120. In another implementation, some or all of the processing may be performed by another device, or a set of devices, either in conjunction with or apart from AFE 120. FIGS. 4-13 are diagrams illustrating an exemplary implementation.

Processing may begin with a request for a document being received from client 130 (block 305) (FIG. 3A). As shown in FIG. 4, assume that client 130 issues a request for a document at the web site www.site.com. The request may be received by network 140. A domain name server (DNS) lookup may occur to translate the hostname www.site.com into a corresponding network address (e.g., IP address). A DNS server (not shown) connected to network 140 may perform the DNS lookup so that the request from client 130 can be appropriately routed through network 140. In this case, assume that the DNS lookup results in a network address for AFE 120.

Figure 5:
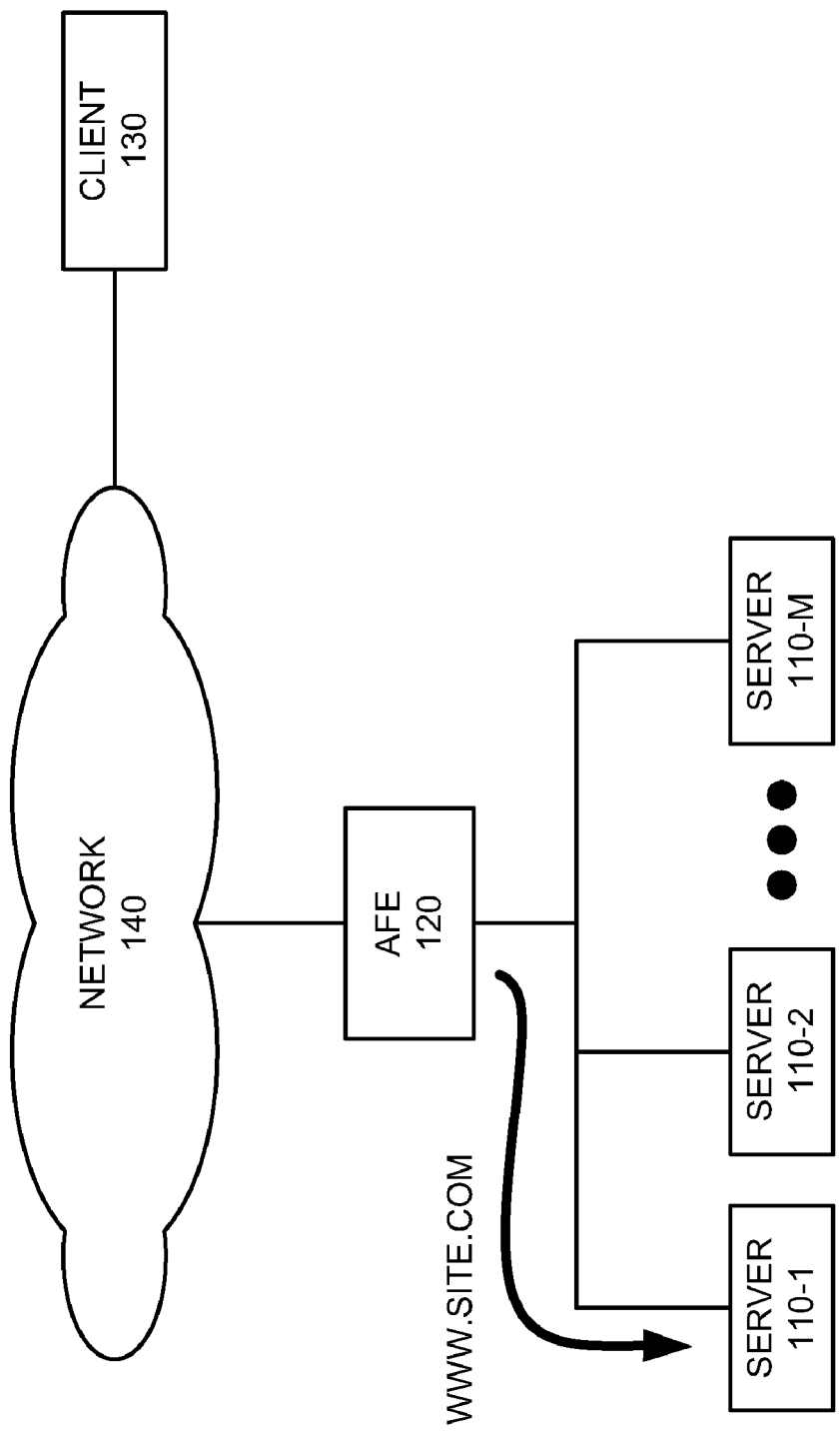

The received request may be forwarded to a server 110 (block 310). For example, AFE 120 may analyze the request to identify the request as a request for servers 110. AFE 120 may contain a mapping of hostnames to servers. Assume that AFE 120 maps the hostname www.site.com to the set of servers including servers 110. AFE 120 may forward the request to one of servers 110, as shown in FIG. 5. For example, AFE 120 may be configured to send all requests to a particular one of servers 110, distribute requests based on some rule, or use some other criteria to determine how to forward requests.

Figure 6:
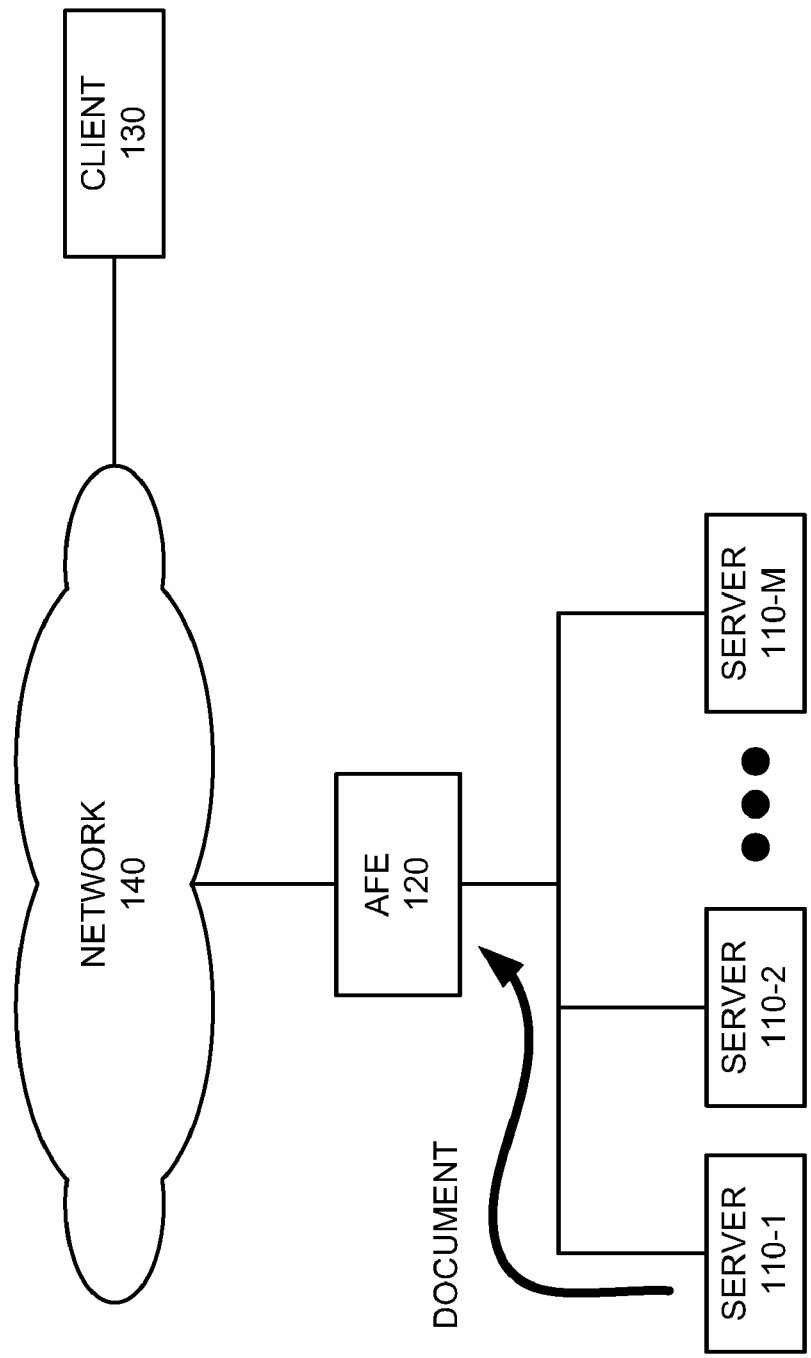
Figure 7:
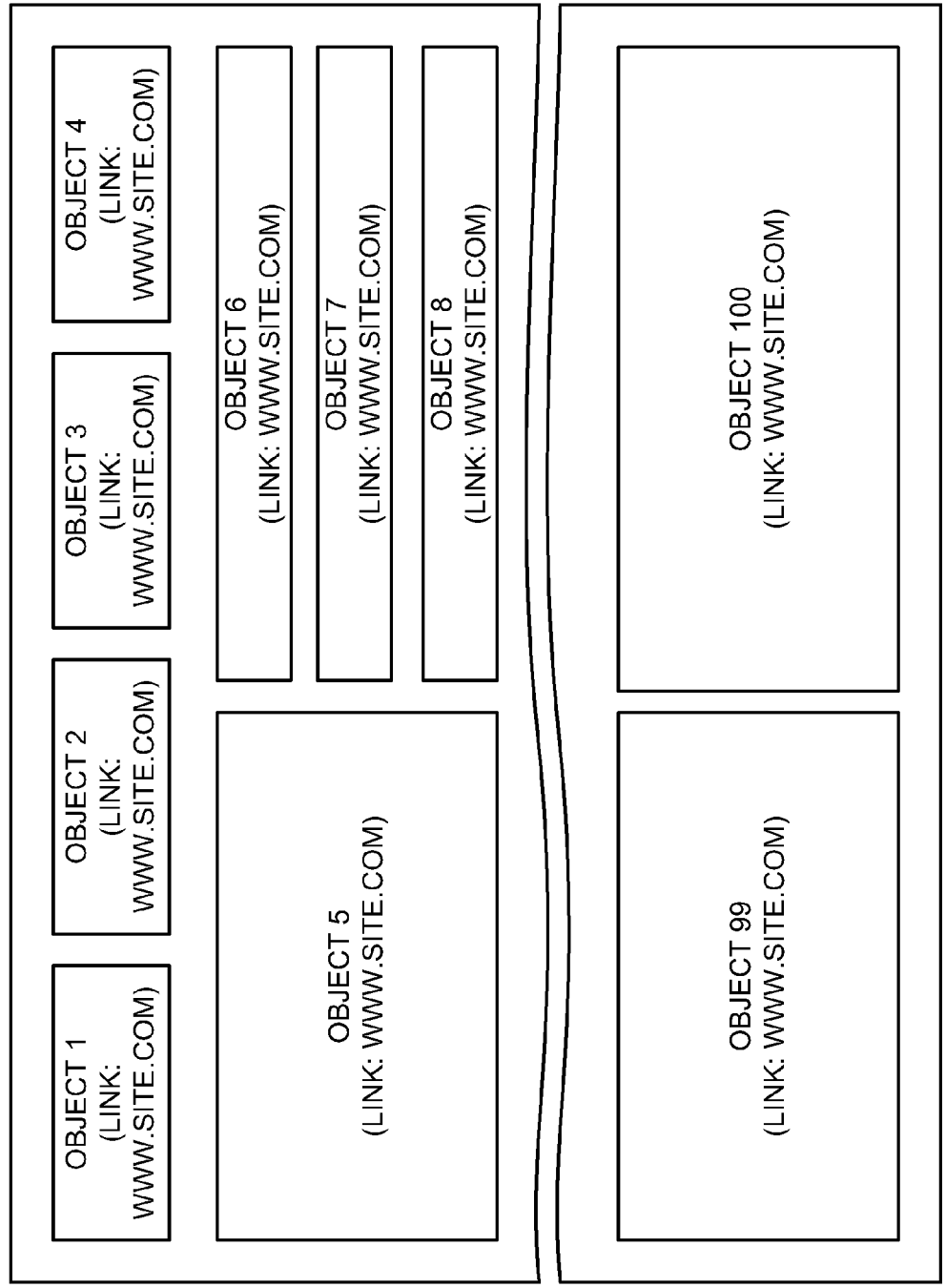

Server 110 may process the request and send a document to AFE 120, as shown in FIG. 6. The document may be received from server 110 and links for objects within the document that are associated with a particular hostname may be identified (blocks 315 and 320). For example, AFE 120 may parse the document (e.g., any code or text representation of the document, such as Hypertext Markup Language (HTML) code, American Standard Code for Information Interchange (ASCII) code, or another type of code or text) to identify the links within the document that are associated with a particular hostname. In one implementation, AFE 120 may identify the relative links within the document. As shown in FIG. 7, assume that the document includes one hundred objects (e.g., object 1, object 2, . . . , object 100) that have corresponding links that are associated with the hostname www.site.com.

The identified links in the document may be dynamically modified to links that point to multiple, different hostnames (block 325). For example, AFE 120 may replace one of the identified links with a link that points to one of a set of different hostnames. In one implementation, AFE 120 may assign the different hostnames in a round robin fashion. The particular number of different hostnames in the set of hostnames may be configurable. For example, the number of hostnames may be set by an operator or specified by a customer (e.g., an entity associated with at least a portion of the content of servers 110). In another implementation, the number of connections that are desired to be opened may be specified, and the number of different hostnames may be determined based on the desired number of connections (assuming that one hostname equals two connections).

Figure 8:
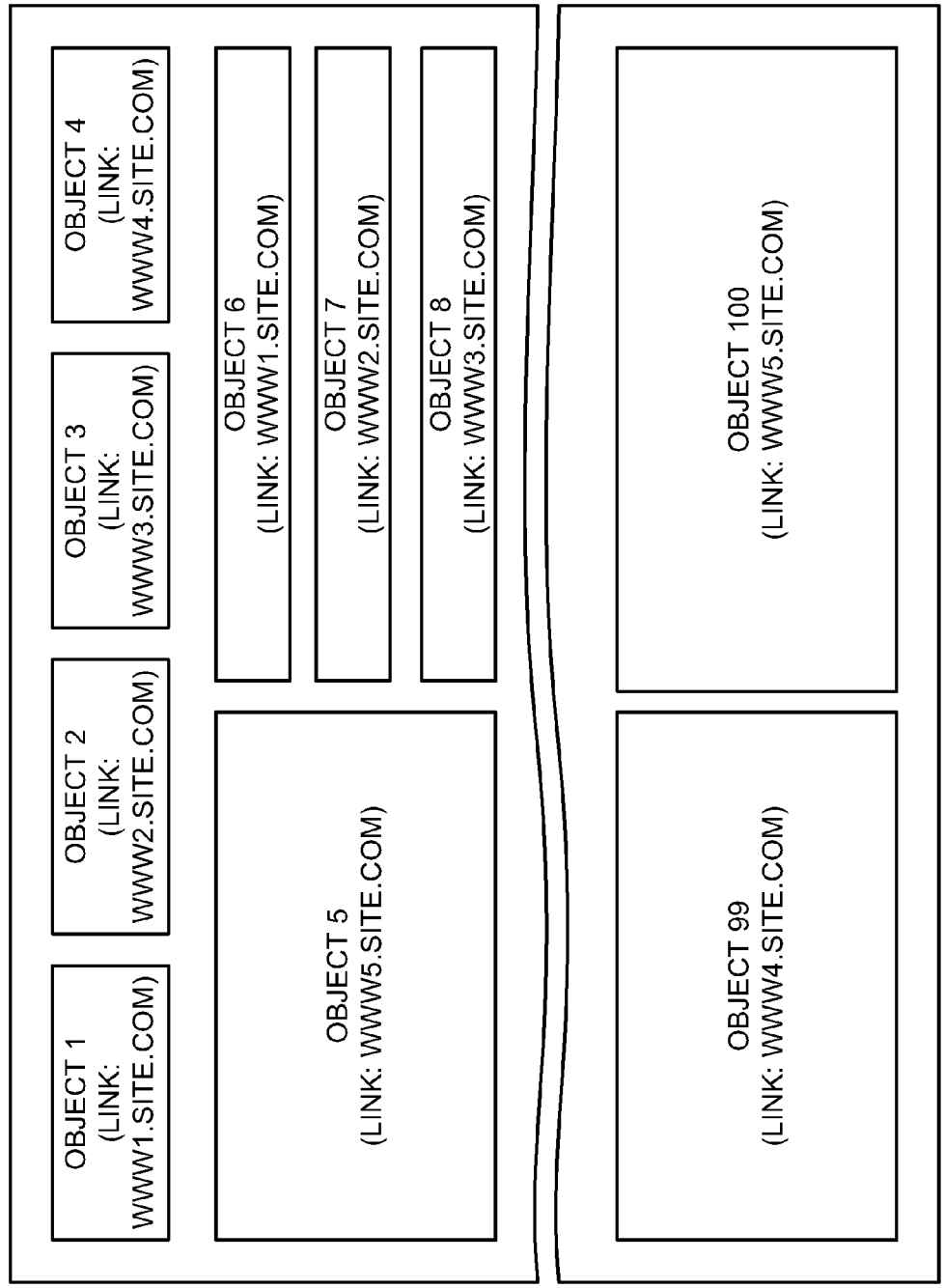

As shown in FIG. 8, assume that the set of hostnames includes five hostnames: www1.site.com, www2.site.com, www3.site.com, www4.site.com, and www5.site.com. In one implementation, AFE 120 may use a set of rules to modify the identified links. One exemplary rule might include:

content contains "src=\"/" then
replace content term "src=\"http://www1.site.com/"
"src=\"http://www2.site.com/" "src=\"http://www3.site.com/"
"src=\"http://www4.site.com/" "src=\"http://www5.site.com/"

In this case, AFE 120 may replace the identified links (in this case, relative links) with links associated with the five hostnames in a round robin fashion. For example, as shown in FIG. 8, the link for object 1 may be modified to a link that points to www1.site.com; the link for object 2 may be modified to a link that points to www2.site.com; the link for object 3 may be modified to a link that points to www3.site.com; . . . ; and the link for object 100 may be modified to a link that points to www5.site.com. It may take less than a millisecond (e.g., on the order of a tenth or a hundredth of a microsecond) for AFE 120 to perform the replacing of the identified links with the links that point to the different hostnames.

Figure 9:
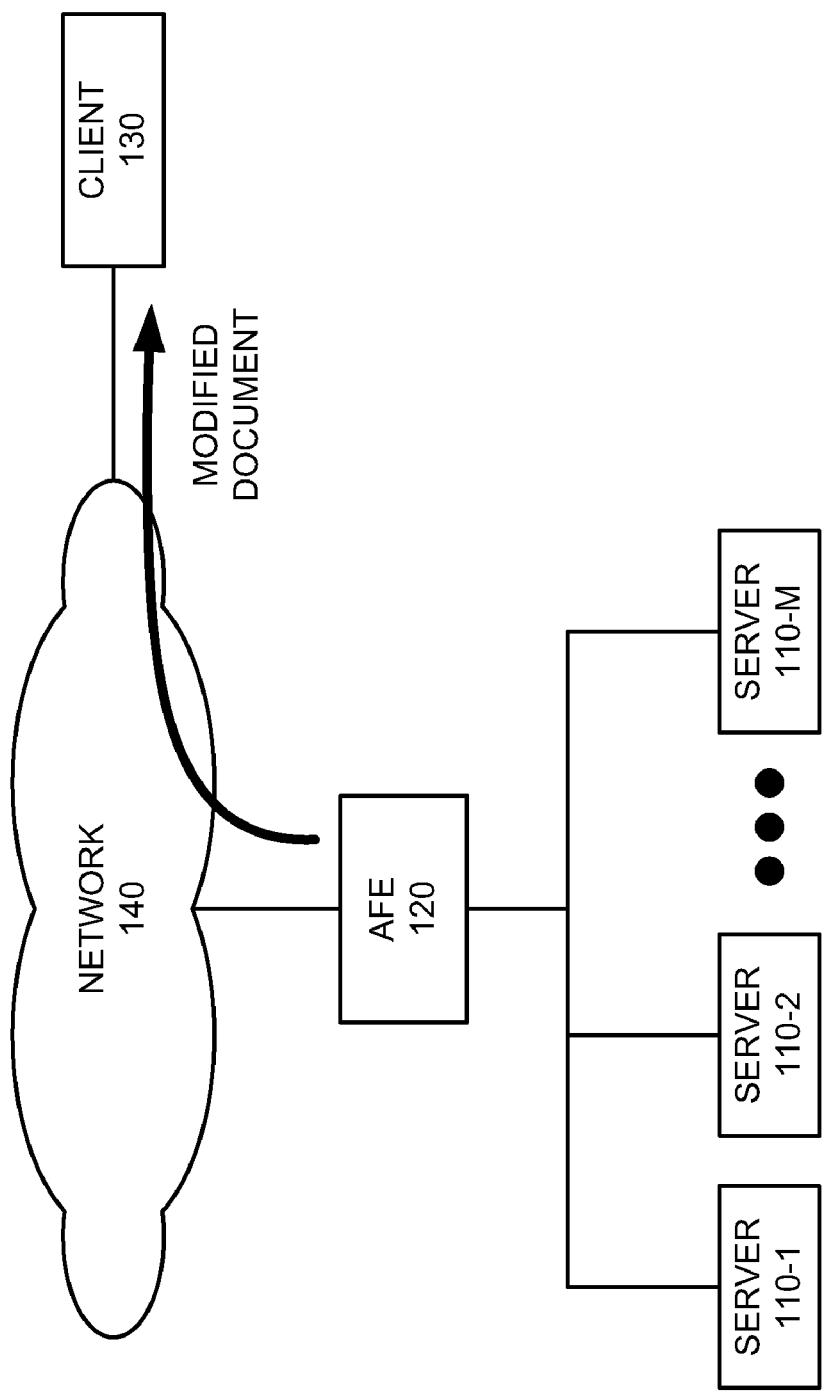

The modified document may be sent to client 130 (block 330) (FIG. 3B). For example, AFE 120 may send the document, which has had its links replaced with links that point to the different hostnames, to client 130, as shown in FIG. 9. Client 130 may process the document. For each unique hostname identified within the document, the browser of client 130 may open two connections (e.g., TCP connections) to download the objects corresponding to the hostnames. In the example described with regard to FIGS. 4-13, the browser of client 130 may open ten connections—two connections for each hostname www1.site.com, . . . , www5.site.com. These extra connections may parallelize much of the downloading of the objects within the document.

Figure 10:
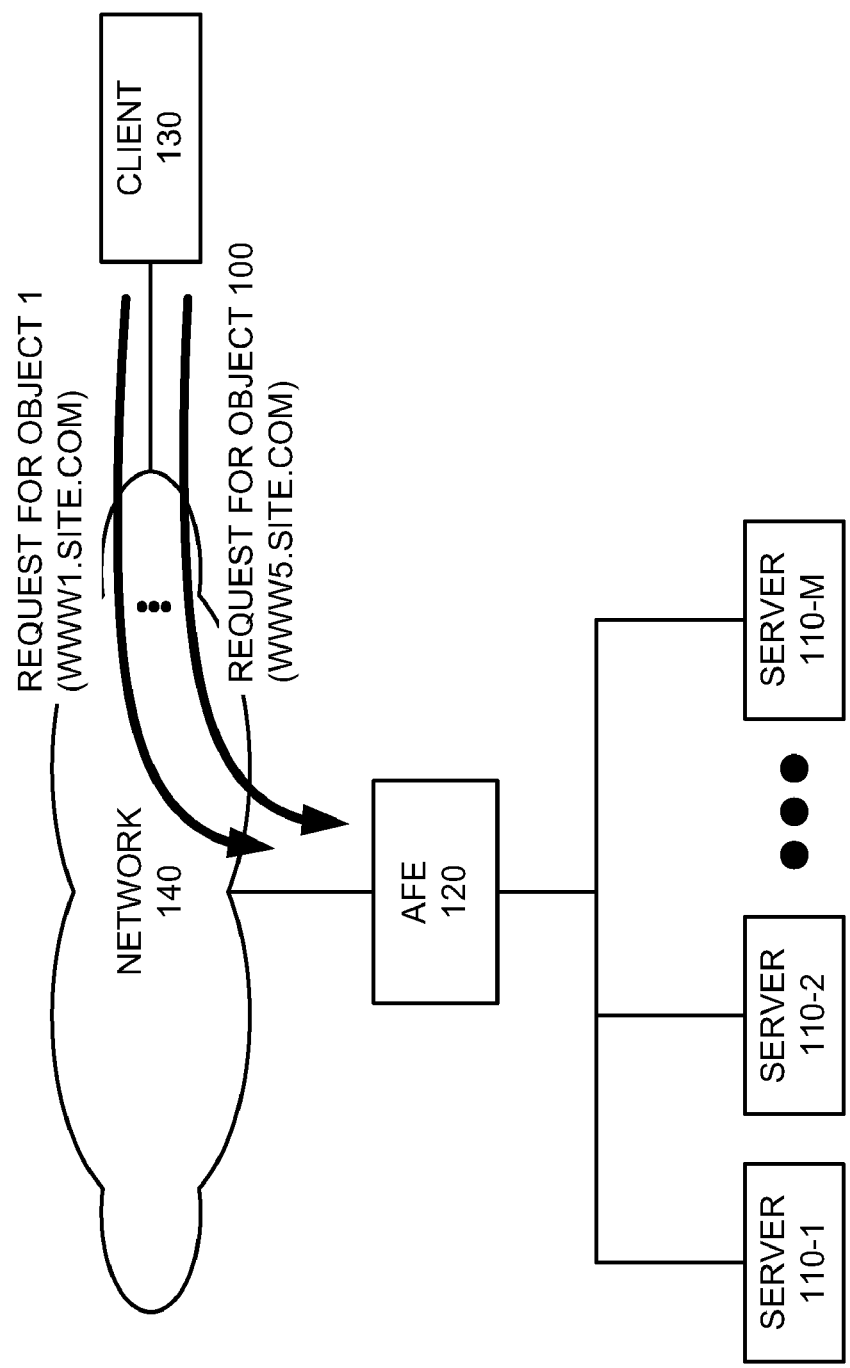

Requests for objects within the document may be received from client 130 (block 335). For example, client 130 may issue a request for each object within the document. Each request may be directed to the hostname associated with the corresponding link. As shown in FIG. 10, the request for object 1 may be directed to www1.site.com, . . . , and the request for object 100 may be directed to www5.site.com.

The requests may be received by network 140. DNS lookups may occur to translate the hostnames www1.site.com, www2.site.com, . . . , www5.site.com into corresponding network addresses (e.g., IP addresses). A DNS server (not shown) connected to network 140 may perform the DNS lookups so that the requests from client 130 can be appropriately routed through network 140. In one implementation, assume that the DNS lookups all result in the same network address (i.e., the network address for AFE 120), as shown in FIG. 10.

The requests may be received by AFE 120 and analyzed to determine where the requests should be sent. For example, AFE 120 may analyze the requests to identify the requests as requests for servers 110. AFE 120 may contain a mapping of hostnames to servers. Assume that AFE 120 maps the hostnames www1.site.com, www2.site.com, . . . , and www5.site.com to the set of servers including servers 110.

Figure 11:
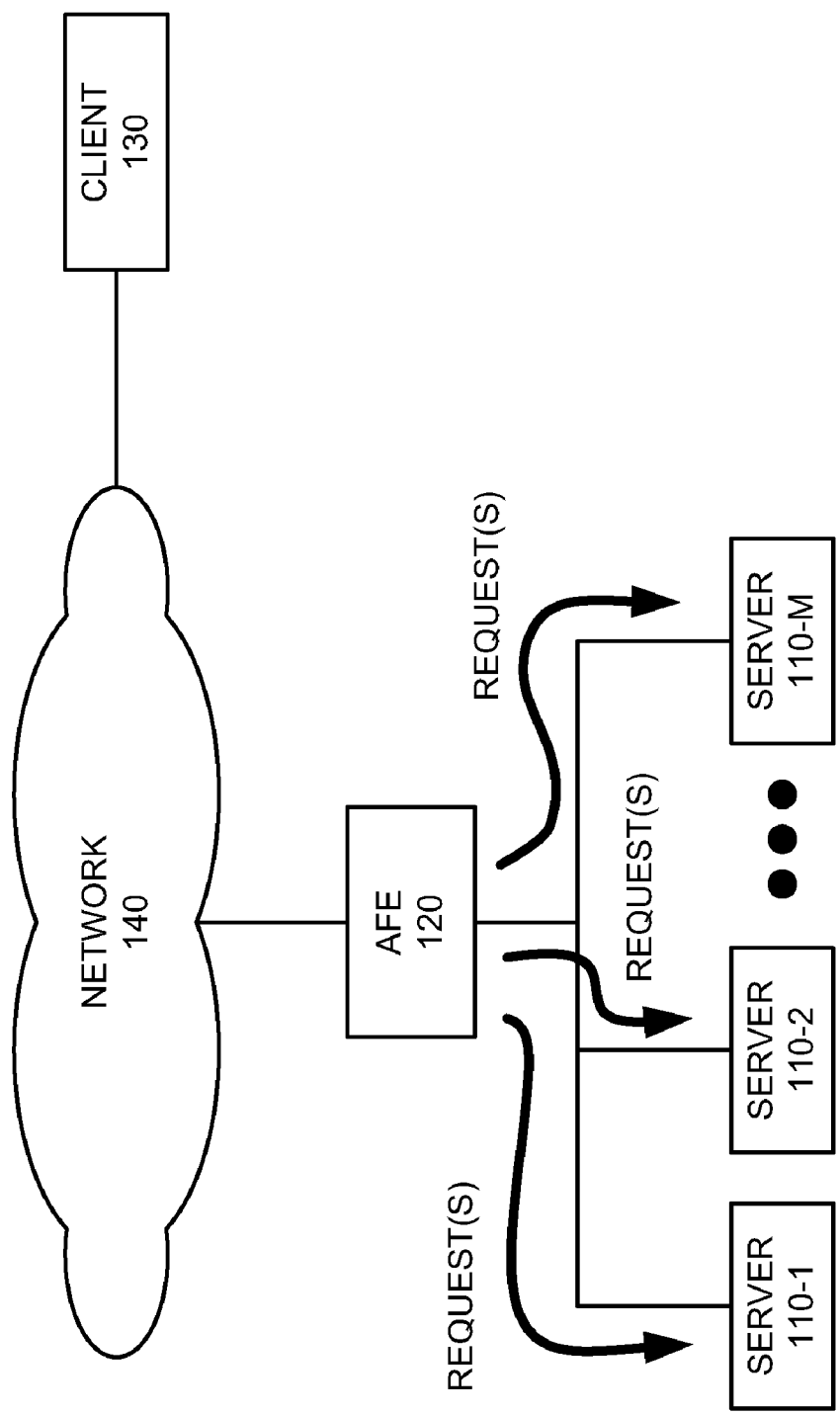

The requests may be distributed to servers 110 (block 340). For example, AFE 120 may send the requests to servers 110, as shown in FIG. 11, according to some rule. In one implementation, AFE 120 may be configured to send the requests according to a load balancing technique, a technique that takes server health into consideration, a technique based on the assigned hostname (e.g., a request for www2.site.com might be given to server 110-2), or according to some other technique that might facilitate handling of the requests.

Servers 110 may process the requests and return the requested objects to AFE 120, as shown in FIG. 12. The objects may be received from servers 110 (block 345). AFE 120 may process the objects and identify them for transmission to client 130. The objects may be sent to client 130 (block 350). For example, AFE 120 may send the objects to client 130 via network 140 over the opened connections, as shown in FIG. 13. The browser of client 130 may process the objects so that the document may be rendered on a display associated with client 130.

The dynamic link modification described herein has several advantages. One advantage is that links associated with a particular hostname (e.g., relative links) may be automatically and dynamically rewritten to links associated with a flexible number of different hostnames. This may permit additional connections to be opened than would otherwise be opened, thereby reducing the time it takes to download objects associated with a document.

Another advantage is that the requests for objects may be efficiently processed. For example, the requests may be processed by a group of servers and requests may be distributed to the servers according to a load balancing scheme or a scheme based on server health, thereby improving the handling of the requests.

Other advantages may also be evident to one skilled in the art.

Conclusion

Implementations described herein may automatically change the content of a document to cause additional connections to be opened at a web browser, thereby parallelizing much of the downloading of the objects within the document. In these implementations, nothing needs to be done at the web servers. The web servers can continue to operate as usual, processing requests and serving content.

As a result of the implementations described herein, the time it takes to download the objects within a document may be greatly reduced. For example, a document that may previously have taken on the order of twenty-seven seconds to download can be downloaded in a little as four seconds. Download times may be further reduced for documents that have a lot of content, documents that have large file sizes (e.g., 50 kB, 100 kB, or more), or clients with high latency connections.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A and 3B, the order of the acts may differ in other implementations consistent with the principles of the invention. Also, non-dependent acts may be performed in parallel.

Further, while it has been described that the client opens two additional connections for each unique hostname in a document, this need not be the case. In other implementations, the client may open more than two connections for each unique hostname.

Moreover, the preceding description focused on implementations where the identifier is a hostname. As explained above, the identifier may take other forms. For example, when the identifier is an address, AFE 120 may modify links for objects within a document that are associated with a particular hostname to addresses (e.g., IP addresses) that map to a number of different virtual addresses on AFE 120 that are associated with the same group of target hosts (e.g., servers 110). When the identifier is a port number, AFE 120 may modify links for objects within a document that are associated with a particular hostname to a particular virtual address (e.g., a virtual IP address, like 10.10.10.1) with a number of different port numbers (e.g., TCP port numbers, like 10.10.10.1:81, 10.10.10.1:82, . . . , 10.10.10.1:N) that map to AFE 120 and are associated with the same group of target hosts (e.g., servers 110).

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a server, a document that includes a plurality of first links for a corresponding plurality of objects within the document, each of the first links including a same hostname;
automatically modifying, by the server, the first links in the document to second links that include a plurality of different hostnames; and
transmitting, by the server, the document with the second links to a client.

2. The method of claim 1, where receiving a document includes:
receiving a request for the document from the client,
forwarding the request to another server, and
receiving the document from the other server based on the request.

3. The method of claim 1, where the document includes code or text; and
the method further comprises:
parsing the code or text to identify the first links in the document.

4. The method of claim 1, where automatically modifying the first links includes:
receiving information regarding a total number of the connections desired to be opened at the client,
determining a number of different hostnames to use based on the received information, and
replacing the first links with the second links that include the different hostnames based on the determined number of different hostnames.

5. The method of claim 1, where automatically modifying the first links includes:
replacing the first links with the second links that include the different hostnames in a round robin fashion when a number of the first links exceeds a number of the different hostnames, where multiple ones of the first links are replaced with multiple ones of the second links that point to a same one of the different hostnames.

6. The method of claim 1, where automatically modifying the first links includes:
replacing the first links with the second links that include the different hostnames based on a set of rules.

7. The method of claim 1, where the automatically modifying the first links is performed in less than a millisecond.

8. The method of claim 1, where the document is hosted by a plurality of servers, and
where the method further comprises:
receiving, from the client, requests for the objects, where each of the requests includes one of the different hostnames.

9. The method of claim 8, further comprising:
distributing the requests for the objects to the servers.

10. The method of claim 9, where distributing the requests for the objects includes:

sending the requests to the servers according to a load balancing technique.

11. The method of claim 9, where distributing the requests for the objects includes:
sending the requests to the servers based on health of the servers.

12. The method of claim 8, where each unique one of the different hostnames in the document transmitted to the client causes the client to open a plurality of connections; and
where the method further comprises:
sending the objects to the client over the opened connections.

13. A device, comprising:
a memory to store instructions; and
a processor to execute the instructions to:
identify a plurality of first links in a document, the first links corresponding to a plurality of objects within the document and including a same hostname;
replace the first links in the document with second links that include a plurality of different hostnames; and
forward the document with the second links to a client.

14. The device of claim 13, where the processor is further to:
receive a request for the document from the client,
forward the request to a server, and
receive the document from the server based on the request.

15. The device of claim 13, where the document includes code or text; and
the processor is further to:
parse the code or text to identify the first links in the document.

16. The device of claim 13, where when replacing the first links, the processor is further to:
receive information regarding a total number of connections desired to be opened at the client,
determine a number of different hostnames to use based on the received information, and
modify the first links to second links that include the different hostnames based on the determined number of different hostnames.

17. The device of claim 13, where when replacing the first links, the processor is further to:
modify the first links to the second links that include the different hostnames in a round robin fashion when a number of the first links exceeds a number of the different hostnames, where multiple ones of the first links are modified to multiple ones of the second links that point to a same one of the different hostnames.

18. The device of claim 13, where when replacing the first links, the processor is further to:
modify the first links to the second links that include the different hostnames based on a set of rules.

19. The device of claim 13, where the first links are replaced with the second links in less than a millisecond.

20. The device of claim 13, where the document is hosted by a plurality of servers, and
where the processor is further to:
receive, from the client, requests for the objects, where each of the requests includes one of the different hostnames.

21. The device of claim 20, where the processor is further to:
distribute the requests for the objects to the servers.

22. The device of claim 21, where when distributing the requests for the objects, the processor is further to:
send the requests to the servers according to a load balancing technique.

23. The device of claim 21, where when distributing the requests for the objects, the processor is further to:
send the requests to the servers based on health of the servers.

24. The device of claim 20, where each unique one of the different hostnames in the document forwarded to the client causes the client to open a plurality of connections; and
the processor is further to:
send the objects to the client over the opened connections.

25. The device of claim 24, where the opened connections are transmission control protocol (TCP) connections.

26. The device of claim 13, where each of the different hostnames resolves to an address associated with the device.

27. A system, comprising:
a plurality of servers; and
a device, connected to the servers, to:
receive a document from one of the servers, the document including a plurality of first links for objects within the document,
modify the first links to second links that include a plurality of different hostnames, each unique one of the different hostnames causing a plurality of connections to be opened by a client,
forward the document with the second links to the client,
receive, from the client, a plurality of requests for the objects,
distribute the requests to the servers,
receive the objects from the servers, and
forward the objects to the client over the opened connections.

28. A method performed by a device, the method comprising:
receiving, by the device, a document that includes a plurality of first links for a corresponding plurality of objects within the document, each of the first links including a same identifier;
automatically modifying, by the device, the first links in the document to a plurality of second links that include a plurality of different identifiers, each of the different identifiers resolving to the device; and
transmitting, by the device, the document with the second links to a client.

29. The method of claim 28, where the same identifier includes a same hostname and the plurality of different identifiers includes a plurality of different hostnames, a plurality of different addresses, or a plurality of different port numbers.

30. A device, comprising:
a memory to store instructions; and
a processor to execute the instructions to:
identify a plurality of first links in a document, the first links corresponding to a plurality of objects within the document and being associated with a same hostname;
replace the first links in the document with second links associated with a plurality of different addresses; and
forward the document with the second links to a client.

31. The device of claim 30, where when replacing the first links, the processor is further to:
receive information regarding a total number of connections desired to be opened at the client,
determine a number of different addresses to use based on the received information, and
modify the first links to second links that point to the different addresses based on the determined number of different addresses.

32. The device of claim 30, where when replacing the first links, the processor is further to:

modify the first links to the second links that point to the different addresses in a round robin fashion when a number of the first links exceeds a number of the different addresses, where multiple ones of the first links are modified to multiple ones of the second links that point to a same one of the different addresses.

33. The device of claim 30, where when replacing the first links, the processor is further to:
to modify the first links to the second links that point to the different addresses based on a set of rules.

34. The device of claim 30, where the document is hosted by a plurality of servers, and
where the processor is further to:
receive, from the client, requests for the objects, where each of the requests is associated with one of the different addresses.

35. The device of claim 34, where the processor is further to:
distribute the requests for the objects to the servers.

36. The device of claim 30, where each unique one of the different addresses in the document forwarded to the client causes the client to open a plurality of connections; and
the processor is further to:
send the objects to the client over the opened connections.

37. The device of claim 30, where each of the different addresses is associated with the device.

38. A device, comprising:
a memory to store instructions; and
a processor to execute the instructions to:
identify a plurality of first links in a document, the first links corresponding to a plurality of objects within the document and include a same hostname;
replace the first links in the document with second links associated with a plurality of different port numbers; and
forward the document with the second links to a client.

39. The device of claim 38, where when replacing the first links, the processor is further to:
receive information regarding a total number of connections desired to be opened at the client,
determine a number of different port numbers to use based on the received information, and
modify the first links to second links that point to the different port numbers based on the determined number of different port numbers.

40. The device of claim 38, where when replacing the first links, the processor is further to:
modify the first links to the second links that point to the different port numbers in a round robin fashion when a number of the first links exceeds a number of the different port numbers, where multiple ones of the first links are modified to multiple ones of the second links that point to a same one of the different port numbers.

41. The device of claim 38, where when replacing the first links, the processor is further to:
modify the first links to the second links that point to the different port numbers based on a set of rules.

42. The device of claim 38, where the document is hosted by a plurality of servers, and
where-the processor is further to:
receive, from the client, requests for the objects, where each of the requests is associated with one of the different port numbers.

43. The device of claim 42, where the processor is further to:
distribute the requests for the objects to the servers.

44. The device of claim 38, where each unique one of the different port numbers in the document forwarded to the client causes the client to open a plurality of connections; and
the processor is further to:
send the objects to the client over the opened connections.

45. The device of claim 38, where each of the different port numbers corresponds to one or more ports of the device.

* * * * *

UNITED STATES PATENT AND TRADEMARK OFFICE
CERTIFICATE OF CORRECTION

| | | |
|---|---|---|
| PATENT NO. | : 7,941,741 B1 | Page 1 of 1 |
| APPLICATION NO. | : 11/456725 | |
| DATED | : May 10, 2011 | |
| INVENTOR(S) | : DJ Skillman | |

It is certified that error appears in the above-identified patent and that said Letters Patent is hereby corrected as shown below:

Column 11, claim 33, line 9, delete the word "to" (first occurrence).

Signed and Sealed this
Twenty-sixth Day of July, 2011

David J. Kappos
*Director of the United States Patent and Trademark Office*